US012640404B2

(12) United States Patent
Ruppin

(10) Patent No.: US 12,640,404 B2
(45) Date of Patent: May 26, 2026

(54) ELECTROMAGNETIC STIMULATED RECHARGEABLE BATTERY

(71) Applicant: Arthur Oded Ruppin, Ringwood, NJ (US)

(72) Inventor: Arthur Oded Ruppin, Ringwood, NJ (US)

(*) Notice: Subject to any disclaimer, the term of this patent is extended or adjusted under 35 U.S.C. 154(b) by 490 days.

(21) Appl. No.: 18/202,482

(22) Filed: May 26, 2023

(65) Prior Publication Data

US 2024/0396096 A1 Nov. 28, 2024

(51) Int. Cl.
*H01M 10/44* (2006.01)
*H01M 10/0525* (2010.01)
*H01M 10/42* (2006.01)

(52) U.S. Cl.
CPC ... *H01M 10/4235* (2013.01); *H01M 10/0525* (2013.01)

(58) Field of Classification Search
CPC .......... H01M 10/4235; H01M 10/0525; Y02E 60/10
See application file for complete search history.

(56) References Cited

U.S. PATENT DOCUMENTS

2021/0391592 A1 12/2021 Partanen
2022/0093981 A1* 3/2022 Heenan ..................... H02J 7/12

FOREIGN PATENT DOCUMENTS

| | | | |
|---|---|---|---|
| CN | 202384849 | U | 8/2012 |
| CN | 106992296 | B | 5/2019 |
| CN | 109755682 | A | 5/2019 |
| CN | 212625752 | U | 2/2021 |
| TW | 1655823 | B | 4/2019 |

OTHER PUBLICATIONS

Wang et al., "External field-assisted batteries toward performance improvement", SusMat., 2023, pp. 1-14, DOI: 10.1002/sus2.119, SusMat Wiley, China and Australia.

Ruan et al., "Study on the influence of magnetic field on the performance of lithium-ion batteries", Energy Reports 8, 2021 International Conference on New Energy and Power Engineering (ICNEPE 2021), 2022, pp. 1294-1304, https://doi.org/10.1016/j.egyr.2022.02.095, Elsevier Ltd.

* cited by examiner

*Primary Examiner* — Cynthia K Walls
(74) *Attorney, Agent, or Firm* — Myers Wolin, LLC

(57) ABSTRACT

An electromagnetic stimulated rechargeable battery includes first and second electrodes connected by an ion transfer medium or an ion transfer path that facilitates ion movements between the first and the second electrodes, and one or more electromagnetic radiation generator configured to generate a first set of one or more electromagnetic field during a charge operation, and a second set of one or more electromagnetic field during a discharge operation, the first set being different from the second set, wherein the one or more electromagnetic field is configured to exert a force on the ions to stimulate the movement of ions between the first and the second electrodes.

20 Claims, 5 Drawing Sheets

310      330   370      320

310      330   370      320

340

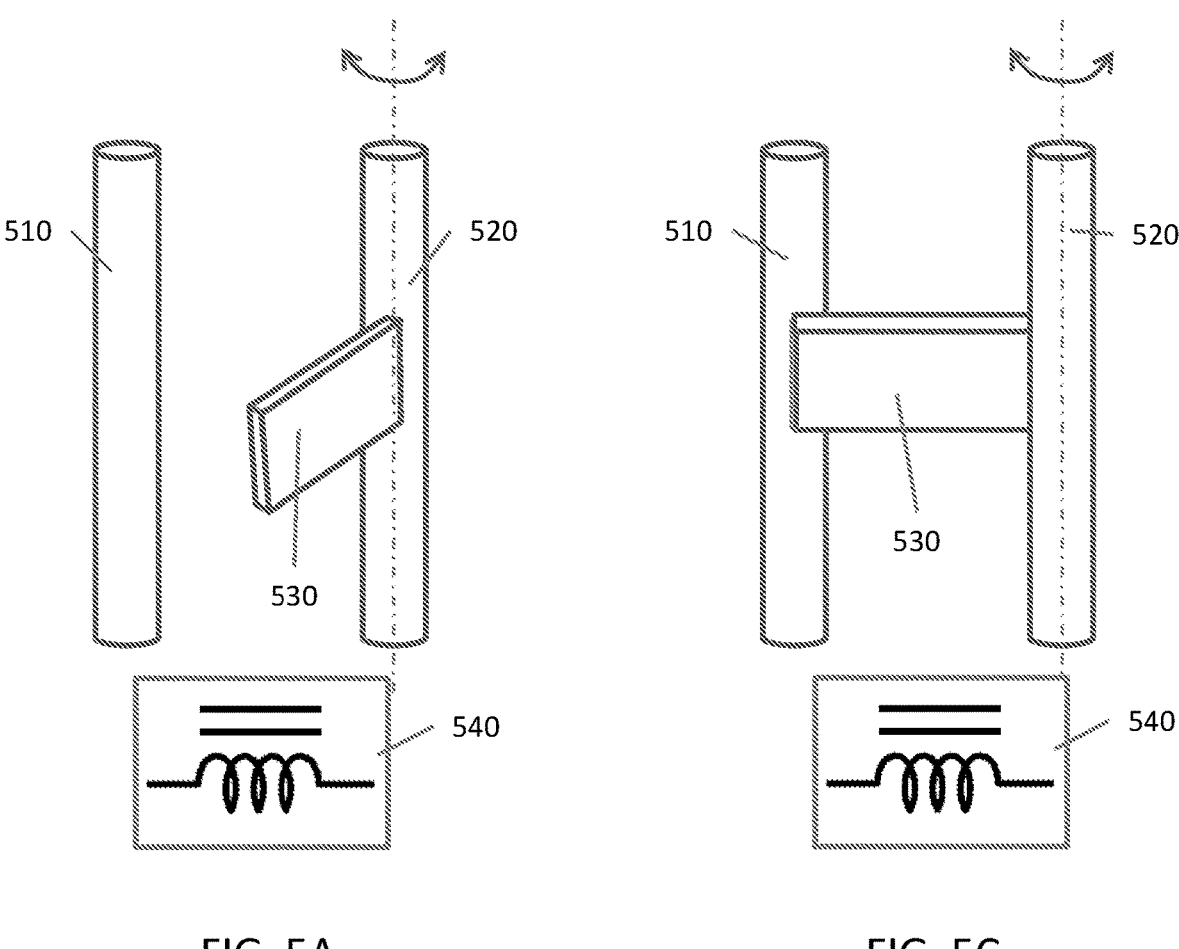
FIG. 5A
FIG. 5C
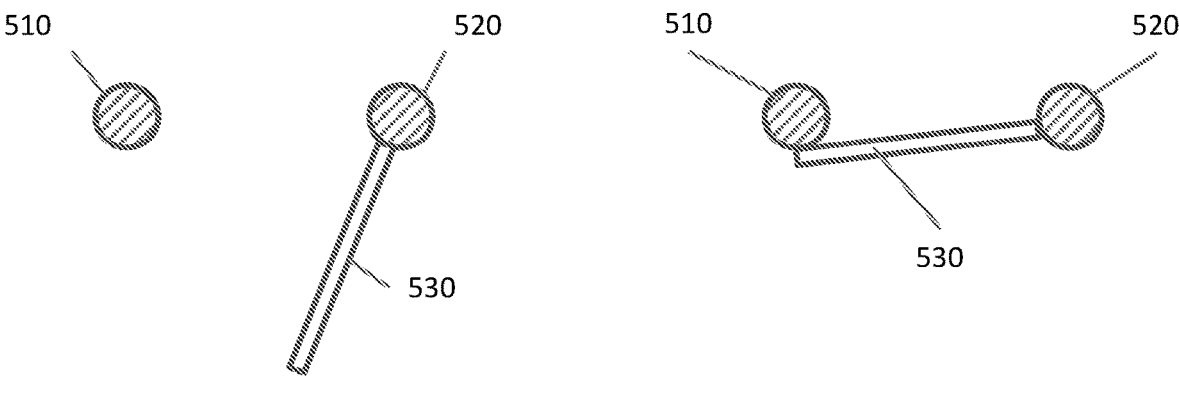
FIG. 5B
FIG. 5D

ELECTROMAGNETIC STIMULATED RECHARGEABLE BATTERY

FIELD

The present disclosure relates to rechargeable batteries, and more specifically to an electromagnetic stimulated rechargeable battery configured to stimulate the movement of charged particles by applying electromagnetic fields to one or more of the electrodes and/or the electrolyte.

BACKGROUND

A rechargeable battery is a type of electrical battery which can be charged, discharged into a load, and recharged many times, as opposed to a disposable or primary battery, which is supplied fully charged and discarded after use. Typically, a rechargeable battery includes one or more electrochemical cells, and it accumulates and stores energy through a reversible electrochemical reaction. Several different combinations of electrode materials and electrolytes are used, including lead-acid, zinc-air, nickel-cadmium (NiCd), nickel-metal hydride (NiMH), lithium-ion (Li-ion), lithium iron phosphate (LiFePO4), and lithium-ion polymer (Li-ion polymer).

The reactants in the electrochemical reactions in rechargeable batteries, as for example in a lithium-ion cell are materials of anode and cathode, both of which are compounds containing lithium atoms. During discharge, an oxidation half-reaction at the anode produces positively charged lithium ions and negatively charged electrons. Lithium ions move through the electrolyte, electrons move through the external circuit, and then they recombine at the cathode (together with the cathode material) in a reduction half-reaction. The electrolyte and external circuit provide conductive media for lithium ions and electrons, respectively, but do not partake in the electrochemical reaction. During discharge, electrons flow from the negative electrode (anode) towards the positive electrode (cathode) through the external circuit. The reactions during discharge lower the chemical potential of the cell, so discharging transfers energy from the cell to wherever the electric current dissipates its energy, mostly in the external circuit. During charging these reactions and transports go in the opposite direction: electrons move from the positive electrode to the negative electrode through the external circuit. To charge the cell the external circuit provides electric energy. This energy is then stored as chemical energy in the cell (with some loss, e.g., due to coulombic efficiency lower than 1). Both electrodes allow lithium ions to move in and out of their structures with a process called insertion (intercalation) or extraction (deintercalation), respectively.

The movement of ions and or electrons and or its accumulation on the electrodes and or reduction of it, create heat that may cause fires and or explosions of the battery. To counter that risk, rechargeable batteries generally limit or slow down charging to 80% of their potential capacity and or apply cooling. Therefore, there is a long-felt need for a rechargeable battery that does not have the above shortcomings that plague the current rechargeable batteries in the market.

The movement of ions and or their accumulation on the electrodes is slow, as the only force moving the ions is the electrical potential between the electrodes. Therefore, there is a long-felt need to accelerate the discharging and more so, the charging of the battery.

SUMMARY

An electromagnetic stimulated rechargeable battery, including: first and second electrodes connected by an ion transfer medium that facilitates ion movements between the first and the second electrodes; and one or more electromagnetic radiation generator(s) configured to generate a first set of one or more electromagnetic field during a charge operation, and a second set of one or more electromagnetic field during a discharge operation, the first set being different from the second set; wherein the one or more electromagnetic field(s) is configured to exert a force on the ions to stimulate the movement of ions between the first and the second electrodes.

An electromagnetic stimulated rechargeable battery, including: first and second electrodes connected by an ion transfer path that facilitates ion movements between the first and the second electrodes; and one or more electromagnetic radiation generator(s) configured to generate a first set of one or more electromagnetic field(s) during a charge operation, and a second set of one or more electromagnetic field during a discharge operation, the first set being different from the second set; wherein the one or more electromagnetic field(s) is configured to exert a force on the ions to stimulate the movement of ions between the first and the second electrodes.

BRIEF DESCRIPTION OF THE DRAWINGS

FIG. 5A is a perspective view of a disconnected ion transfer path of an electromagnetic stimulated rechargeable battery according to an embodiment.

FIG. 5B is a top view of a disconnected ion transfer path of an electromagnetic stimulated rechargeable battery according to an embodiment.

FIG. 5C is a perspective view of a connected ion transfer path of an electromagnetic stimulated rechargeable battery according to an embodiment.

FIG. 5D is a top view of a connected ion transfer path of an electromagnetic stimulated rechargeable battery according to an embodiment.

DETAILED DESCRIPTION

Figure 1:
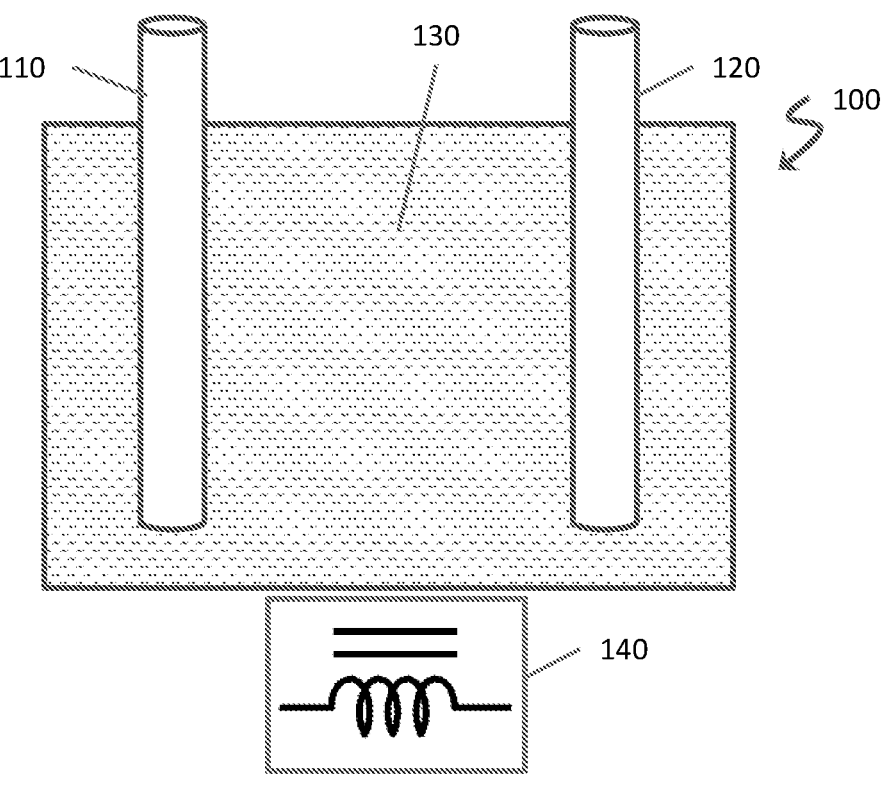
FIG. 1 is a diagram of an electromagnetic stimulated rechargeable battery according to an embodiment.

The description of illustrative embodiments according to principles of the present disclosure is intended to be read in connection with the accompanying drawings, which are to be considered part of the entire written description. In the description of embodiments of the disclosure herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an examples presented solely for illustrative purposes by reference to the accompanying drawings to advise one of ordinary skill in the art of the advantages and construction of the certain embodiments. In the various views of the drawings, like reference characters designate like or similar parts.

As discussed above, in a typical rechargeable battery, the electrodes are immersed in an electrolyte that provides a constant ion transfer path between the electrodes when charging or discharging and acts as a barrier (although not absolute) when not charging or discharging. In contrast, a rechargeable according to an embodiment of the present disclosure has a switchable ion transfer path that can be turned on and off, and in some embodiments the width/size (i.e., throughput) of the ion transfer path can be adjusted. An embodiment herein provides a rechargeable battery that is configured to bring two electrodes together when charging or discharging by moving one electrode towards the other (like clapping hands or banging cymbals) and having the two electrodes be apart when not charging or discharging, thus lowering the intercalation of the battery as set up in the customary manner and likely having more charge/discharge cycles and faster charge time as likely the ion transfer throughput can be made larger and there may even be multiple and/or redundant ion transfer paths.

FIG. 1 shows an electromagnetic stimulated rechargeable battery 100 according to one embodiment. The battery includes a first electrode 110 and a second electrode 120. The electrodes are connected by an ion transfer medium 130 that facilitates movements of ions between first and second electrodes. An electromagnetic field generator 140 is configured to generate electromagnetic field(s) to stimulate the movement of ions between electrodes. In this embodiment, the electromagnetic generator 140 is situated outside of the battery. The electromagnetic generator 140 may be powered by an external power source or the battery 100 as a power source itself via lead wires or induction power circuitry or capacitive power circuitry.

Note that an electromagnetic field generator may be, for example, an electromagnet. An electromagnet includes a magnetic coil which generates an electromagnetic field when a current passes through the coil. When a current is reversed, the field generated by the electromagnetic generator is reversed. The electromagnet may further include a core made of a high permeability material for concentrating the magnetic field. Also, one or multiple electromagnetic field generators may be used to generate the desired electromagnetic fields. A skilled person in the art would understand that the interactions of charged particles with electromagnetic field(s) are governed by the Maxwell's equations and Lorentz force equation.

Figure 2:
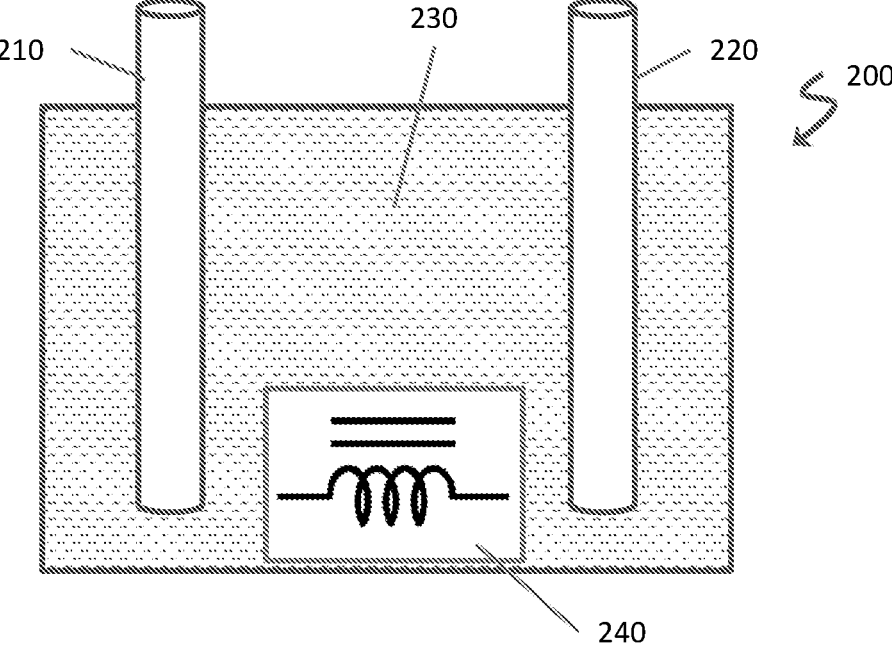
FIG. 2 is a diagram of an electromagnetic stimulated rechargeable battery according to an embodiment.

FIG. 2 shows an electromagnetic stimulated rechargeable battery 200 according to one embodiment. The battery includes a first electrode 210 and a second electrode 220. The electrodes are connected by an ion transfer medium 230 that facilitates movements of ions between first and second electrodes. An electromagnetic field generator 240 is configured to generate electromagnetic field(s) to stimulate the movement of ions between electrodes. In this embodiment, the electromagnetic generator 240 is integrated into the battery. The electromagnetic generator 240 may be powered by an external source of power or by the battery 200 via internal circuits.

Note that an ion transfer medium can be selected from a wide variety of media that effectively facilitate movements of ions. For example, the medium is an electrolyte that may be in solid or gel form, e.g., ceramic solid electrolytes, polymer gel electrolytes, or plasticized polymer electrolytes. It is understood that the choice of the medium depends also on the compositions of the electrodes.

Note that the electrolyte is not a perfect barrier (when the battery is not charged/discharged), and without an electrolyte, the movement of ions can be faster, with less heat generating, as the electrolyte adds friction. Thus, an ion transfer region may be made from the same material as the electrode and may not need to include any electrolyte materials. For example, the ion transfer region may be a film formed on the surface of the electrode itself during charging, and this film functions as an ionic conductor that allows ions to be transported through the film. In one embodiment, the two electrodes are connected via an ion transfer region through which ions are exchanged between electrodes. The electromagnetic stimulation can greatly enhance the performance of a medium-less rechargeable battery.

Figure 3A:
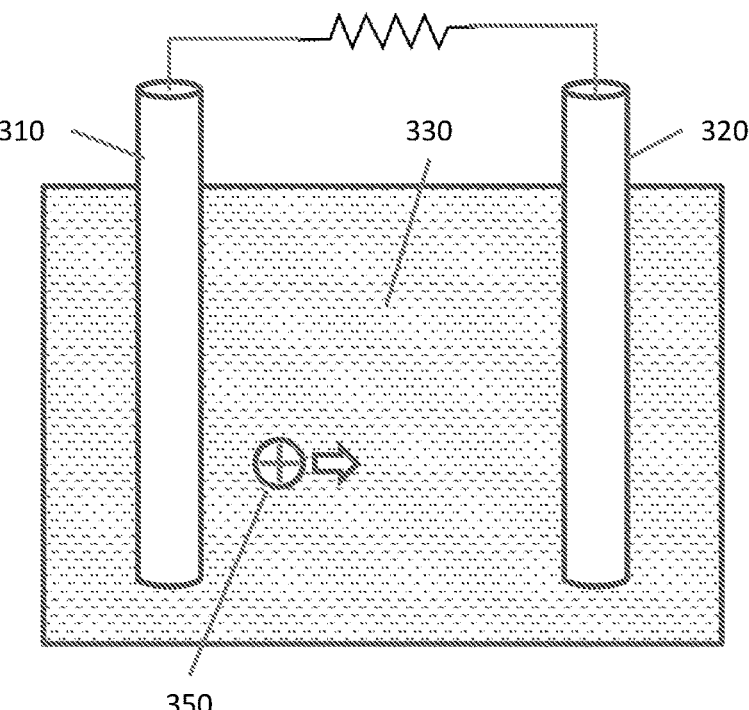
FIG. 3A shows the movement of ions during a discharge operation without electromagnetic stimulation.
Figure 3B:
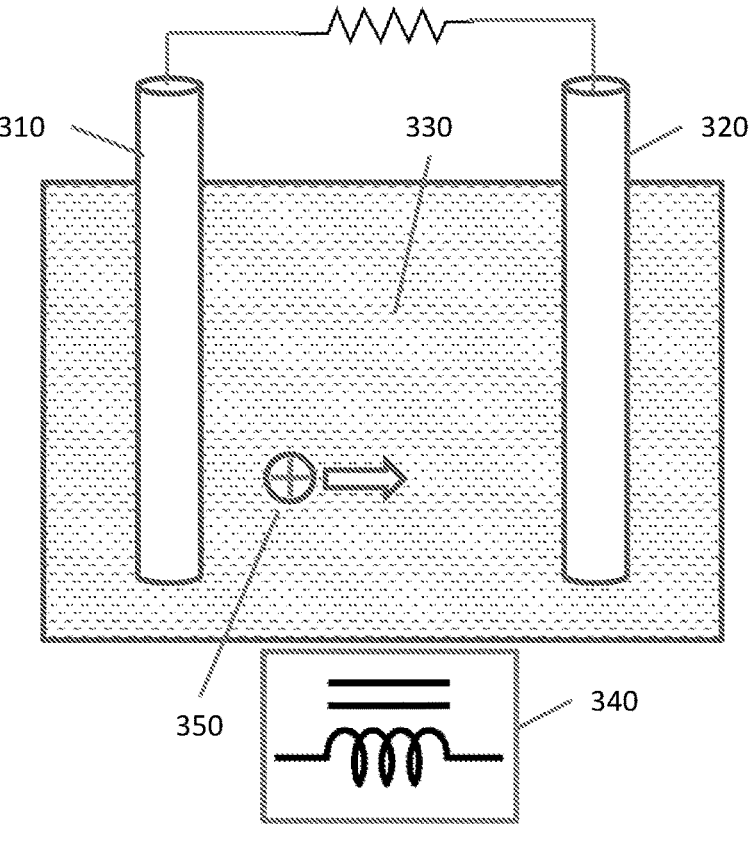
FIG. 3B shows the movement of ions during a discharge operation with electromagnetic stimulation according to an embodiment.

FIGS. 3A and 3B illustrate how the performance of a rechargeable battery in a discharge operation is enhanced by electromagnetic stimulation according to one embodiment. As illustrated in FIG. 3A, when an external load is connected to the electrodes 310 and 320, an external electric current passes through the load, and ion 350 moves through the medium 330 from the electrode 310 towards the electrode 320 inside the battery. Without any stimulation, the ion 350 moves at a speed just like a standard rechargeable battery, which has many performance issues as discussed above in the background section. When an electromagnetic field generator 340 generates an electromagnetic field, the electromagnetic field will exert a force on the positive charged ion 350, which assist the ion 350 to move from electrode 310 to electrode 320.

Figure 3C:
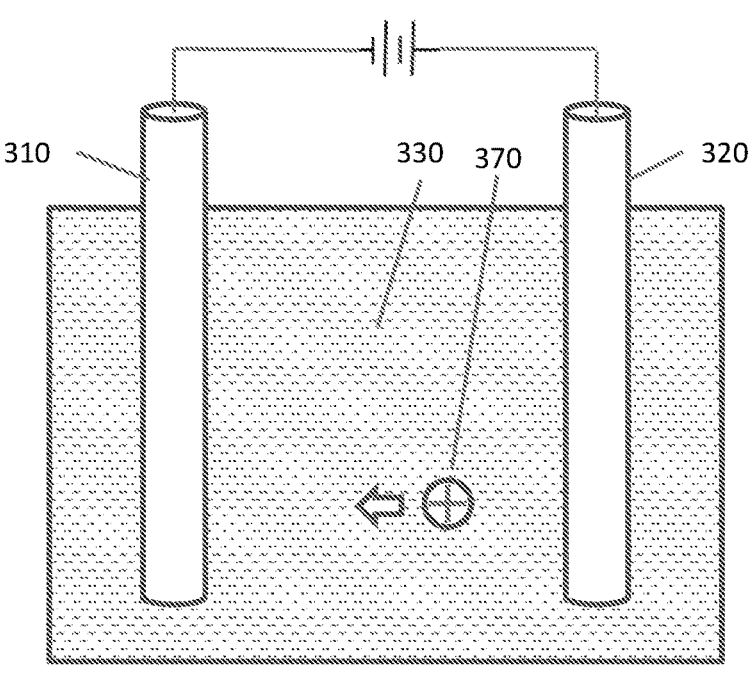
FIG. 3C shows the movement of ions during a charge operation without electromagnetic stimulation.
Figure 3D:
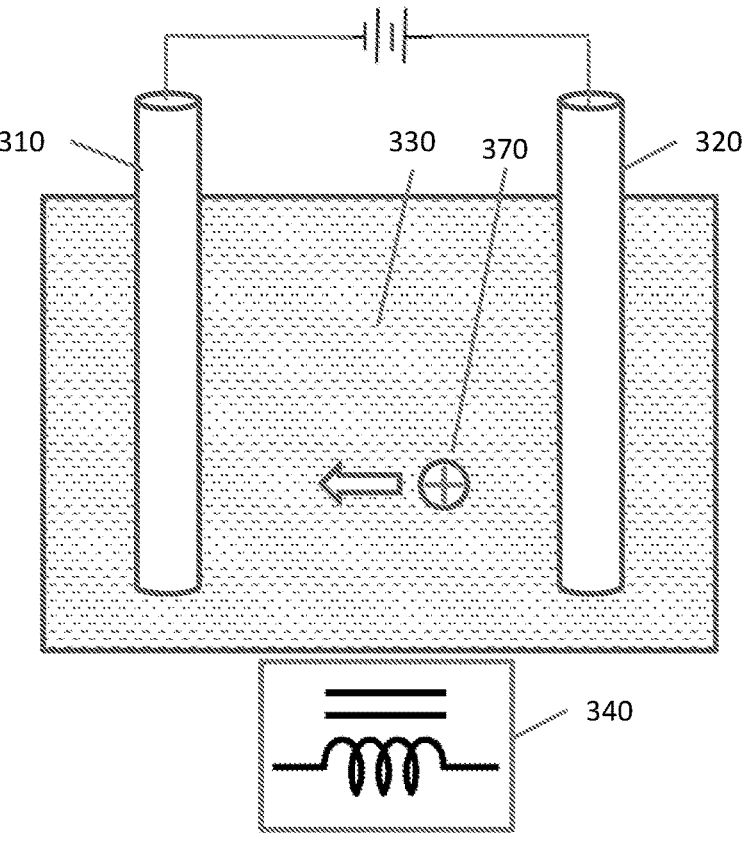
FIG. 3D shows the movement of ions during a charge operation with electromagnetic stimulation according to an embodiment.

FIGS. 3C and 3D illustrate how the performance of a rechargeable battery in a charge operation is enhanced by electromagnetic stimulation according to one embodiment. In a charge operation, when an external power source is connected to the electrodes, and the direction of current and movement of ions are reversed. As illustrated in FIG. 3C, ion 370 moves through the medium 330 from the electrode 320 towards the electrode 310 inside the battery. Without any stimulation, the ion 370 moves at a speed just like a standard rechargeable battery. When an electromagnetic field generator 340 generates an electromagnetic field, the electromagnetic field will exert a force on the positive charged ion 370, which assist the ion 370 to move from electrode 320 to electrode 310. The electromagnetic field generated in the charge operation is different from the electromagnetic field generated in the discharge operation. In one embodiment, the force exerted on the ions in the charge operation is in an opposition direction to the force exerted on the ions in the discharge operation.

Figure 4A:
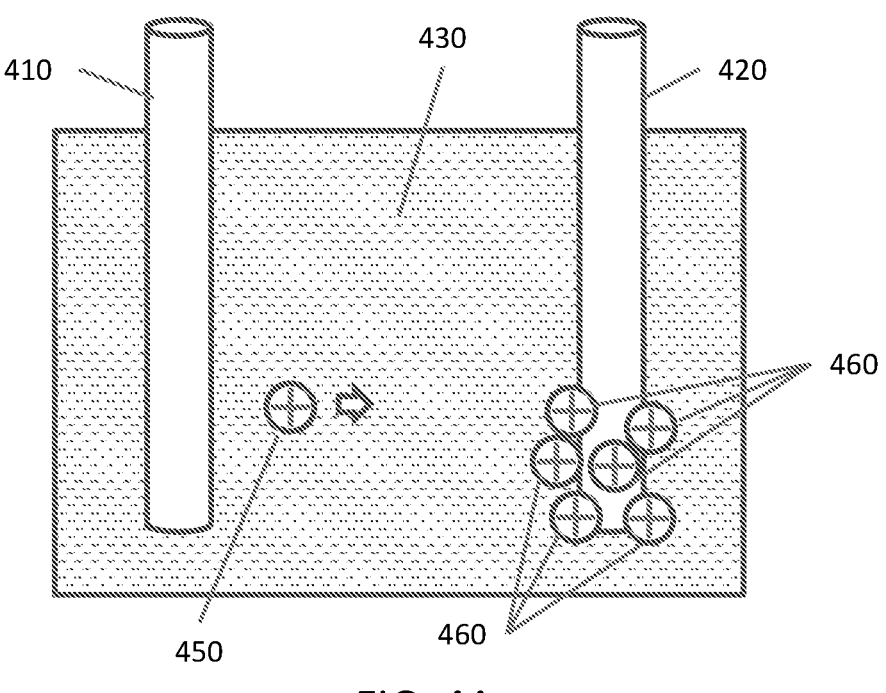
FIG. 4A shows an accumulation of ions around an electrode.
Figure 4B:
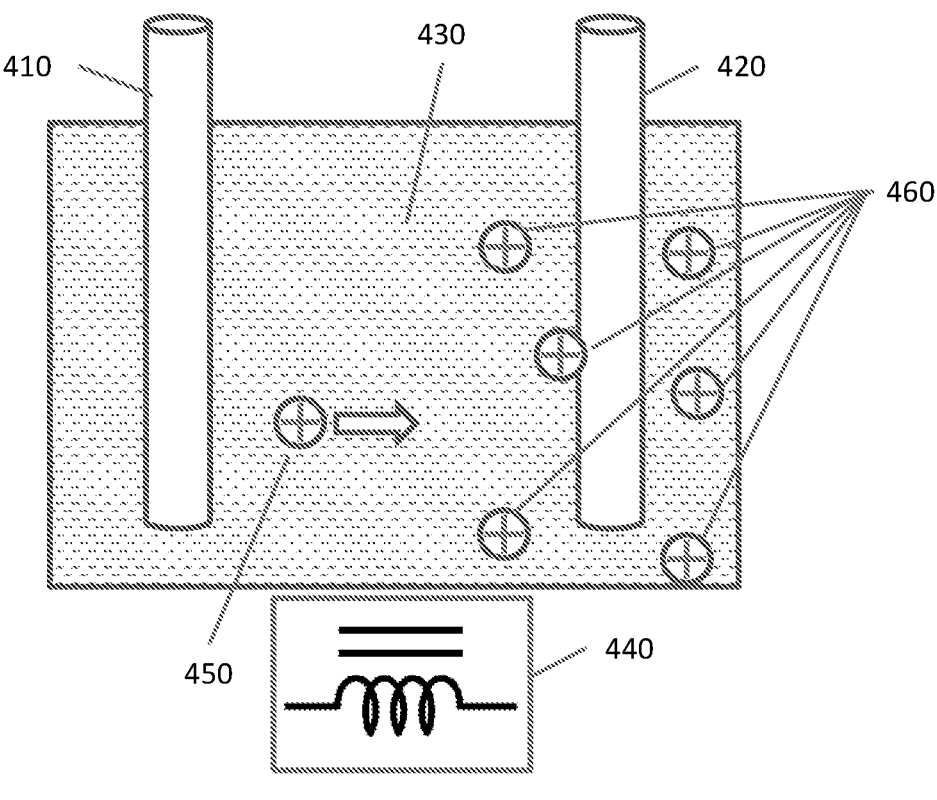
FIG. 4B shows ions which are being dispersed from the electrode by an electromagnetic field according to an embodiment.

FIGS. 4A and 4B illustrate how the performance of a rechargeable battery is enhanced by electromagnetic stimulation according to one embodiment. For simplicity, the figures illustrate only one particular direction of ion movements regardless of whether it is a discharge or charge operation. One can easily reverse the arrangement between discharge and charge operations by symmetry. As shown in FIG. 4A, an ion 450 is moving from electrode 410 to electrode 420 through the medium 430. However, due to inefficiency in an electrochemical process at the electrodes, some ions 460 not yet taken part in the electrochemical process may have already accumulated around the electrode 420. The charges on the accumulated ions 460 create an electric field that exerts a repulsive force on the ion 450, and therefore impede the movement of ions between the electrodes. As shown in FIG. 4B, the electromagnetic field generator generates an electromagnetic field that is configured to disperse the accumulated ions 460 around the electrode 420. When the ions 460 are dispersed, the electric field from the charges of the ions 460 is reduced, and hence the repulsive force exerted on the ion 450 is reduced. In one embodiment, the electromagnetic field is directed to at least one of the electrodes, depending on where the ions accumulate.

To disperse the ions 460, the electromagnetic field is one or more electromagnetic pulse according to one embodiment. Once dispersed, majority of the ions 460 may re-accumulate around the electrode 420 after a period of time (relaxation time). To maintain the electrode 420 free from ion accumulation, the electromagnetic field includes electromagnetic pulses having a repetition rate based on the relaxation time of the ions according to one embodiment. The electromagnetic field may be directed to different electrodes depending on whether it is a charge or discharge operation.

In one embodiment, the electromagnetic field includes an oscillating field which results in an oscillating force having a "shaking the bottle" effect on the ions, where ions are unclogged from a bottleneck. The frequency of the oscillation depends on a relaxation time of the ions according to one embodiment. Note that the bottleneck may not be limited to the area around the electrode. In many rechargeable batteries, there is a separator (not shown) situated between the electrodes. The separator prevents the electrodes from short circuiting but it is porous for ion movements. Inefficiency in the separator may result in a bottleneck at the separator for ion movements. Thus, ions may also accumulate near the separator. In one embodiment, the electromagnetic field is directed to a specific location of the ion transfer medium, e.g., the location of the separator to enhance ion movements.

It is also beneficial to fully utilize the volume of the ion transfer medium to allow bigger flow volume for the ions. Furthermore, by having ions arriving at the electrodes at different speeds and/or times, there is a lower chance of ions backing up at the bottleneck. Thus, the electromagnetic fields may include fields in different directions and/or different field strengths.

In one embodiment, the force exerted on the ions by the one or more electromagnetic field is in the same direction as the movement of ions. However, in another embodiment, it is beneficial to have the force exerted on the ions by the one or more electromagnetic field in the opposite direction as the movement of ions. This is because if the movement of ions is too fast, the heat generated associated with cause fire or damage to the battery or shorten the battery cycle life. Slowing down the movement of ions may mitigate these risks.

Furthermore, in one embodiment, the electromagnetic field is generated according to a programmed sequence. The programmed sequence of electromagnetic fields may have different characteristics depending on the particular situation. The characteristics may include at least one of: electromagnetic field duration, field strength, field direction, static field, variable field, oscillating field, pulse, repetition rate, and the program sequence may include one or more combinations of these characteristics. In one embodiment, the programmed sequence provides a smart charging and/or discharging operation. An electromagnetic stimulated rechargeable battery according to one embodiment can obviate the need for an external smart charger for rechargeable batteries. Because the smarting charging and discharging functions are already provided in an electromagnetic stimulated rechargeable battery according to one embodiment, only a standard power source is needed, making it more convenient for the user. Therefore, one embodiment of the present disclosure provides a smart battery which regulates the discharging and charging operations by one or more programmed sequence of electromagnetic fields.

If batteries are used repeatedly even without mistreatment, they lose capacity as the number of charge cycles increases, until they are eventually considered to have reached the end of their useful life. For example, in a lithium-ion type rechargeable battery, some reactive lithium metal can be formed on charging, which is no longer available to participate in the next discharge cycle, and this process reduces the cycling life. Even if the battery is not being charged, such undesirable chemical processes can still slowly take place via an internal stray current because the electrolyte inside the battery provides a permanent ion exchange path between the electrodes. Furthermore, improper storage or installation of the rechargeable battery may accidentally create a short circuit which could cause severe damage to the rechargeable battery or even a fire.

In view of the above problems, an electromagnetic stimulated rechargeable according to one embodiment has a switchable ion transfer path that can be turned on and off, and in some embodiments the width/size (i.e., throughput) of the ion transfer path can be adjusted. In one embodiment, when the ion transfer path is switched on, one or more electromagnetic field is applied to stimulate the ion movement between the electrodes through the established ion transfer path. By controlling the ion transfer paths as well as the electromagnetic fields, the charging and discharging operations of the rechargeable battery can be further regulated.

Various embodiments of controlling the ion transfer paths have been discussed in U.S. patent application Ser. No. 17/980,747, the contents of which are hereby incorporated by reference.

FIGS. 5A-5D illustrate an electromagnetic stimulated rechargeable with switchable ion transfer path according one example embodiment. A first electrode 510 is spaced apart from a second electrode 520. The second electrode 520 is rotatable about an axis, and includes an ion transfer region 530 that extends radially from the rotational axis. The extension of the ion transfer region is larger than the distance between the two electrodes. In a disconnected state as shown in FIGS. 5A and 5B, the ion transfer region 530 is not in contact with the first electrode 510, and thus no ion transfer can take place. In a connected state as shown in FIGS. 5C and 5D, the second electrode 520 is rotated by an angle that brings the ion transfer region 530 in contact with the first electrode 510, establishing an ion transfer path and thus ion transfers can take place between the two electrodes. Thus, by rotating the second electrode 520, the ion transfer path can be turned on and off. The electromagnetic field generator 540 is configured to generate one or more of the electromagnetic field as discussed in the above various embodiments in coordination with the switching on and off of the ion transfer path.

Note that although the electrode movements shown in the above embodiment are associated with the second electrode for simplicity reasons, it should be understood that the illustrated movements are relative movements. It is understood that one or both of the first and the second electrodes can move spatially independently or cooperatively to establish the ion transfer path. The movement of the electrodes can be accomplished by different actuators known to a person of ordinary skill in the art. For example, the electrodes may be moved by a motor, electromagnet, etc. The actuator can be internal or external to the rechargeable battery. Furthermore, the actuator may be powered by the battery itself, or by an external power source.

While the present disclosure describes at some length and with some particularity with respect to the several described embodiments, it is not intended that it should be limited to any such particulars or embodiments or any particular embodiment, but it is to be construed so as to provide the broadest possible interpretation in view of the related art and, therefore, to effectively encompass various embodiments herein. Furthermore, the foregoing describes various embodiments foreseen by the inventor for which an enabling description was available, notwithstanding that modifications of the disclosure, not presently foreseen, may nonetheless represent equivalents thereto.

The invention claimed is:

1. An electromagnetic stimulated rechargeable battery, comprising:

first and second electrodes connected by an ion transfer medium that facilitates ion movements between the first and the second electrodes; and one or more electromagnetic radiation generator configured to generate a first set of one or more electromagnetic field during a charge operation, and a second set of one or more electromagnetic field during a discharge operation, the first set being different from the second set;

wherein the sets of one or more electromagnetic field are configured to exert force on the ions to stimulate the movement of ions between the first and the second electrodes, and the one or more electromagnetic radiation generator is powered by the battery itself.

2. The battery of claim 1, wherein the sets of one or more electromagnetic field are directed to at least one of the first and the second electrodes.

3. The battery of claim 1, wherein the sets of one or more electromagnetic field are directed to a specific location of the ion transfer medium, and the specific location is a location of a separator to enhance ion movements.

4. The battery of claim 1, wherein the forces exerted on the ions by the sets of one or more electromagnetic field are in the same direction as the movement of ions.

5. The battery of claim 1, wherein the sets of one or more electromagnetic field comprise electromagnetic fields having different field strengths.

6. The battery of claim 1, wherein the sets of one or more electromagnetic field comprise electromagnetic fields in multiple directions.

7. The battery of claim 6, wherein the sets of one or more electromagnetic field comprise an electromagnetic field in a first direction during the charge operation and an electromagnetic field in a second direction during the discharge operation, the second direction being opposite to the first direction.

8. The battery of claim 1, wherein the sets of one or more electromagnetic field are configured to disperse an accumulation of ions around at least one of the first and the second electrodes.

9. The battery of claim 8, wherein the sets of one or more electromagnetic fields comprise an electromagnetic pulse having a repetition interval.

10. The battery of claim 9, wherein the repetition interval is longer than a relaxation time of the ions.

11. The battery of claim 1, wherein the ion transfer medium is selected from a group comprising: liquid electrolyte, ceramic solid electrolyte, polymer gel electrolyte, plasticized polymer electrolyte, and solid electrolyte interphase (SEI).

12. The battery of claim 1, wherein the one or more electromagnetic radiation generator is configured to generate a programmed sequence of electromagnetic fields having characteristics comprising one or more of: field duration, field strength, field direction, static field, variable field, oscillating field, pulse, and repetition rate.

13. An electromagnetic stimulated rechargeable battery, comprising:

first and second electrodes connected by an ion transfer path that facilitates ion movements between the first and second electrodes; and one or more electromagnetic radiation generator configured to generate a first set of one or more electromagnetic field during a charge operation, and a second set of one or more electromagnetic field during a discharge operation, the first set being different from the second set;

wherein the sets of one or more electromagnetic field are configured to exert force on the ions to stimulate the movement of ions between the first and the second electrodes, and the one or more electromagnetic radiation generator is powered by the battery itself.

14. The battery of claim 13, wherein the ion transfer path between the first and the second electrodes can be switched on and off.

15. The battery of claim 13, wherein the one or more electromagnetic field is directed to a specific location of the ion transfer path.

16. The battery of claim 13, wherein the ion transfer path is tuned on and off by an actuator powered by an external power source or the battery itself.

17. An electromagnetic stimulated rechargeable battery, comprising:

first and second electrodes;

an ion transfer medium disposed between the first and second electrodes and configured to facilitate ion movement between the electrodes;

one or more electromagnetic field generators configured to generate electromagnetic fields during at least one of a charge operation and a discharge operation, the electromagnetic fields being configured to exert a force on ions to stimulate ion movement between the electrodes; and wherein the one or more electromagnetic field generators are powered by the rechargeable battery itself.

18. The battery of claim 17, wherein the electromagnetic field generators are electrically coupled to at least one electrode.

19. The battery of claim 17, wherein the electromagnetic fields include at least one of a pulsed field, oscillating field, or variable-strength field.

20. The battery of claim 17, wherein the electromagnetic fields are generated according to a programmed sequence during charging or discharging.

* * * * *